United States Patent Office 2,697,327
Patented Dec. 21, 1954

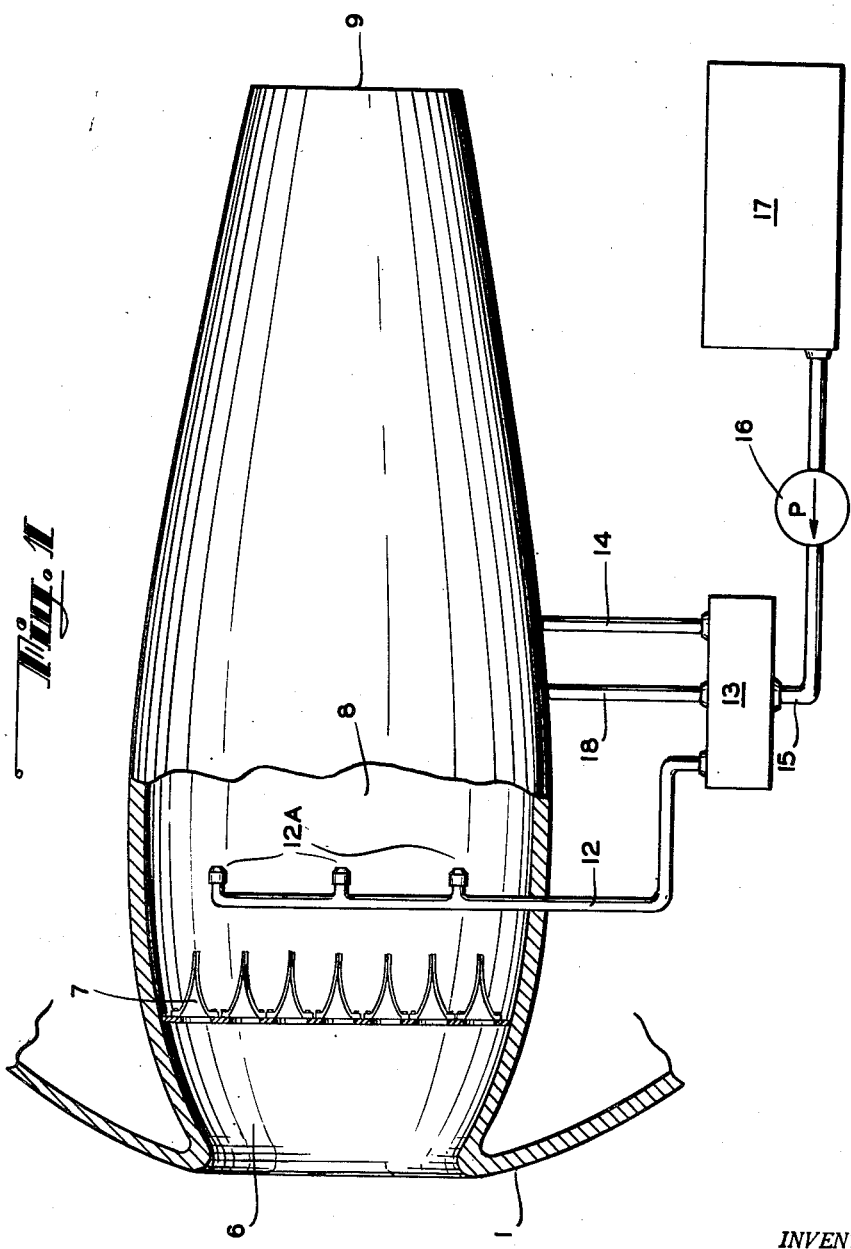

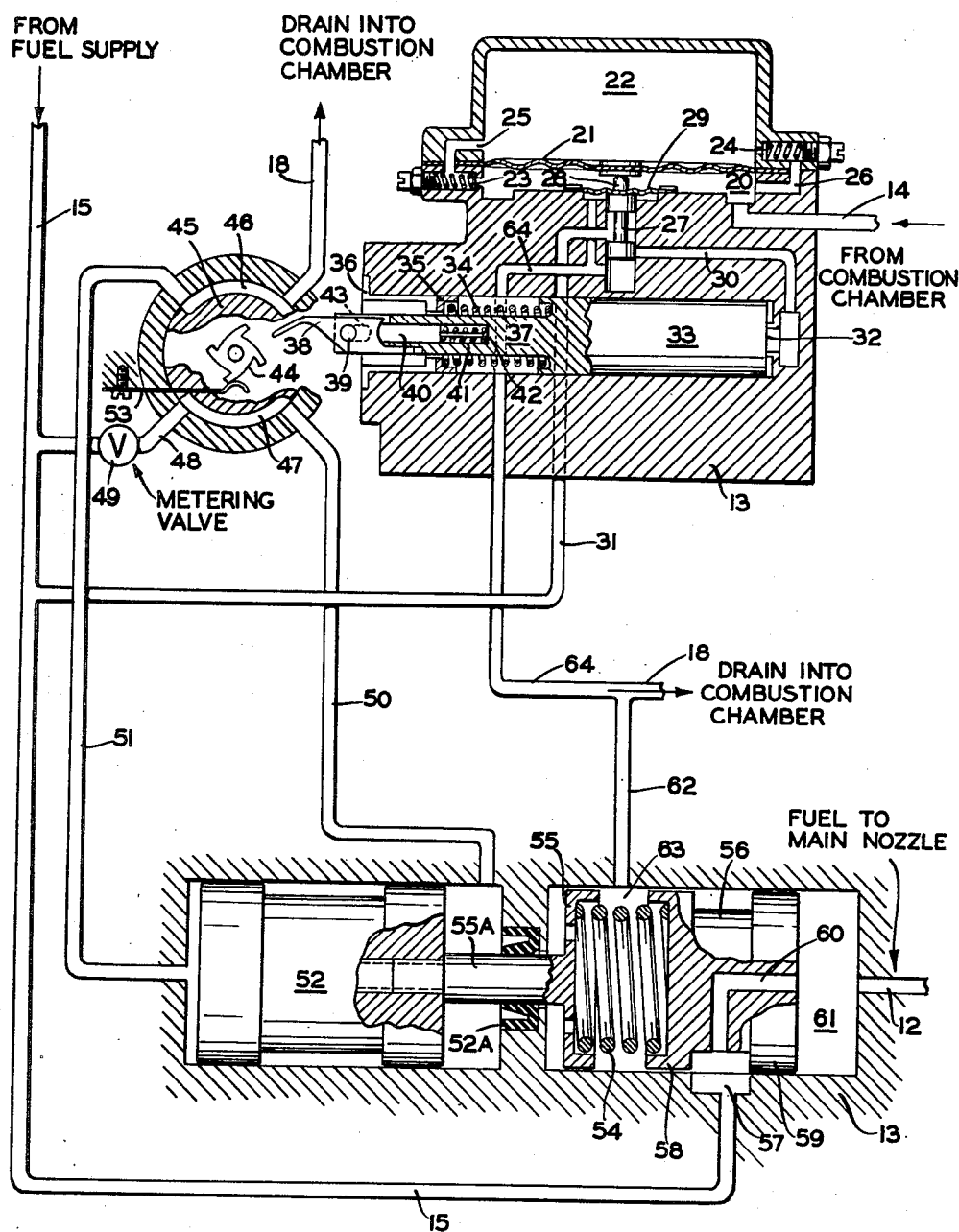

2,697,327

FUEL REGULATOR FOR INTERMITTENT JET ENGINES

Edward J. Hazen, Woodcliff Lake, and James E. Bevins, Ramsey, N. J., assignors to Bendix Aviation Corporation, Teterboro, N. J., a corporation of Delaware Application January 19, 1948, Serial No. 3,006

10 Claims. (Cl. 60—39.28)

The present application relates to a control system and regulator for an intermittent or ram jet engine.

An object of the invention is to provide a device to regulate the fuel pressure delivered to the nozzles of the combustion chamber of the engine so as to maintain the combustion chamber pressure at, or near, the maximum value, which is the optimum operating point.

A characteristic of ram jet engine performance is that with increasing fuel the combustion chamber pressure will increase to a maximum value and then drop off as the fuel flow continues to increase. The actual point at which the pressure starts to decrease is determined by a great many factors, such as ambient air temperature and pressure, and mechanical conditions of the equipment.

An object of the invention is to provide an intermittent or ram jet engine control to supply fuel in constantly varying quantities either increasing or decreasing depending on the engine requirements.

Another object is to provide a control so arranged that at the start the fuel delivered will gradually increase until the combustion chamber pressure passes its maximum value and starts to decrease, at which time the control will operate to start reducing the quantity of fuel delivered which will then cause the combustion pressure to increase again.

Another object of the invention is to provide a control so arranged that as long as the combustion chamber pressure is increasing the control will not operate, but as soon as the pressure begins decreasing it will operate to reverse the rate of change of fuel pressure (i. e., from increasing to decreasing) thus keeping the engine seeking the maximum combustion pressure.

The above and other objects and features of the invention will appear more fully hereinafter from a consideration of the following description taken in connection with the accompanying drawings wherein one embodiment of the invention is illustrated by way of example.

In the drawings:

Figure 1 is a schematic view illustrating the regulator connected in operative relation in a typical ram or intermittent jet engine.

Figure 2 is a diagrammatic view illustrating the operative components of the regulator.

Referring to the drawing of Figure 1, there is indicated generally by the numeral 1 an aircraft or guided missile of conventional type and including an air inlet 6 having suitable air inlet check valves 7 of well known design opening into a combustion chamber 8.

The combustion chamber 8 exhausts operating gas through outlet passage 9 to atmosphere to propel the aircraft or missile 1.

Fuel is supplied to the combustion chamber 8 through a conduit 12 leading to main fuel nozzles 12A opening into the chamber 8. The fuel in conduit 12 is controlled by a regulator 13 sensitive to the pressure in the combustion chamber 8 through a conduit 14, as explained hereinafter.

Fuel is supplied to the regulator 13 through a conduit 15 under pressure of a pump 16 from a suitable fuel supply 17. As explained hereinafter, some of the fuel under pressure of the pump 16, is used to operate the regulator 13. The latter fuel is drained into the combustion chamber 8 through conduit 18 and burned with a low pressure nozzle not shown so as not to be wasted.

As shown diagrammatically in Figure 2, the combustion chamber pressure, taken from a suitable sampling point in the chamber 8 through conduit 14 is led to the under side 20 of a very sensitive membrane or diaphragm 21.

The diaphragm 21 separates two gas chambers 20 and 22 formed in the regulator 13 and which are connected through two lightly loaded spring check valves 23 and 24. The valve 23 opens from the chamber 20 to the chamber 22 through a restricted passage 25, while the valve 24 opens from the chamber 22 to the chamber 20 through a restricted passage 26.

The valves 23 and 24 serve to protect the diaphragm 21 from sudden pressure surges, and to facilitate operation of the diaphragm 21 during very slow pressure changes.

Normally the gas pressures in the two chambers 20 and 22 will be very nearly the same and the diaphragm 21 will assume a neutral position as shown in Figure 2.

The diaphragm 21 controls a pilot valve 27 through an actuating member 28. The pilot valve 27 is normally biased to an upper position by a resilient spring disc 29.

Upon the combustion pressure in the chamber 20 substantially increasing, the pressure under the diaphragm 21 will be higher than that above it in the chamber 22 and therefore such difference in pressure will cause an upward movement of the diaphragm 21. The latter action will likewise cause the valve 27 to move upwardly under the biasing force of resilient disc 29. However, upon the combustion pressure in the chamber 8 substantially decreasing, the diaphragm 21 will move downward contacting the actuating member 28 and causing a corresponding downward movement of the valve 27 so as to connect a passage 30 to the fuel supply conduit 15 through a second passage 31.

The passage 30 leads to an end 32 of a piston 33. Application of fluid pressure to the end 32 of the piston 33 will cause the piston 33 to move to the left, as viewed in Figure 2, against the biasing force of a spring 34 acting at one end against the piston 33 and held at the opposite end by a collar 35, secured in the piston chamber by a member 36.

Projecting through the collar 35 and member 36 is a rod 37 affixed at one end to the piston 33 and having slidably mounted at the opposite end a pawl 38. The pawl 38 is pivotally connected by pin 39 to a rod 40 slidably positioned in a channel 41 formed in the rod 37. A spring 42 is positioned in the channel 41 and biases the rod 40 and pawl 38 towards the left, as viewed in Figure 2. The latter movement of the pawl 38 relative to the rod 37 is limited by the pin 39 which is slidably mounted in a suitable slot 43 formed in the rod 37, and indicated in Figure 2 by dotted lines.

It will seem then that upon application of fluid pressure to the piston 33, the piston 33 will move to the left against the spring 34, causing the pawl 38 to engage one of the teeth of a ratchet 44 to effect rotation thereof. The ratchet 44 is drivingly connected to a four-way type of rotary valve, indicated by the numeral 45 and which alternately connects channels 46 and 47 thereof to drain and a fuel pressure supply line, as will appear hereinafter.

The rotary valve 45 is connected to the fuel inlet supply conduit 15 through a passage 48 having therein a suitable metering valve 49. The rotary valve 45 is also connected to passage 18 leading to the combustion chamber drain nozzle previously described. Outlet conduits 50 and 51 lead from the rotary valve 45 to opposite ends of a servo piston 52. Thus, upon rotation of the four-way rotary valve 45, each side of the servo piston 52 will be alternately connected to the drain line 18 and the fuel pressure supply line 48 for a purpose which will be explained hereinafter.

The rotary valve 45 is held in adjusted position by a detent spring 53 which bears on the ratchet 44.

The piston 52 moves either to the right or to the left, depending on the position of the rotary valve 45, so as to increase or decrease the force asserted by a spring 54, one end of which is supported by a plate member 55 fixed to a rod 55A projecting from the piston 52. The opposite end of the spring 54 bears against a floating regulating valve 56. A seal 52A fits tightly about the rod 55A so as to tend to retard the movement thereof under the fluid pressure. Thus the piston 52 moves slowly either to the right or to the left so that the fuel is slowly increased or decreased depending upon the position of valve 45.

The fuel supply conduit 15 opens at a port 57 between lands 58 and 59 of the floating regulating valve 56.

Passage 60 formed in the regulating valve 56 leads from between the lands 58 and 59 into a chamber 61. The conduit 12 of the regulator 13 leads from the chamber 61 to the main fuel nozzle of the combustion chamber 8.

The main fuel supply for the engine 4 is throttled at the port 57 by the land 58 upon movement of the servo piston 52 towards the right and the thus throttled fuel flows through passage 60 into chamber 61 and then to the main nozzle at the combustion chamber 8. The fuel pressure in the chamber 61 is thus the same as that applied to the main nozzle in the combustion chamber 8 and is determined by the setting of the spring 54, as adjusted through the servo piston 52.

A drain passage 62 leads from a chamber 63 formed between plate member 55 and land 58 to the drain conduit 18 so as to permit drainage of leakage fluid from chamber 63. Another drain passage 64 leads to the drain conduit 18 from the control valve 27. The control valve 27 in the extreme upper position, connects passage 30 to the drain conduit 63 so as to permit piston 33 to return from engagement with ratchet 44 to the position shown under the biasing force of spring 34.

*Operation*

From the foregoing, it will be seen that at the start, the fuel delivered through the nozzle conduit 12 will gradually increase until the combustion chamber pressure at 8 passes a predetermined maximum value and starts to decrease, at which time the control diaphragm 21 will move downward, causing valve 27 to open passage 31 to passage 30 so as to permit flow of a fluid pressure medium to piston 33, to thereby adjust the rotary valve 45 to a position at which the pressure conduit 48 will be connected through valve passage 46 to conduit 51 applying pressure to the left end of servo piston 52, while the right end of piston 52 will be connected to drain passage 18 through valve passage 47.

The latter positioning of the rotary valve 45 will then cause the piston 52 to move slowly from the left to right increasing the tension of spring 54. The increased tension of spring 54 will cause valve 56 to move toward the right and decreasing the quantity of fuel delivered through the conduit 12 to the main nozzle of the combustion chamber 8. The decrease in quantity of fuel will then cause the combustion pressure in chamber 8 to increase again.

As long as the combustion pressure in the chamber 8 is increasing, the control diaphragm 21 will move upwardly and the valve 27 will return under force of spring disc 29 to an upper position at which drain conduit 64 will be connected through passage 30 to piston 33, whereupon piston 33 will return under force of spring 34 to the position shown.

However, as the pressure in chamber 8 begins to decrease upon the fuel quantity decreasing below the optimum value, the diaphragm 21 will once again move downwardly under the biasing force of the greater fluid pressure in chamber 22 actuating the valve 27 so as to connect pressure conduit 31 to the piston 33 causing rotation of the valve 45 to the next succeeding position.

The valve passage 46 will then connect the pressure conduit 48 to the passage 50 and the passage 51 will be connected through valve passage 47 to the drain outlet conduit 18. In the latter position of the rotary valve 45, the piston 52 will then operate to reverse the rate of change of fuel pressure, i. e., from decreasing to increasing, thus keeping the regulator seeking the maximum combustion pressure.

It will be noted that while valves 23 and 24 tend to permit equalization in the pressures in chambers 20 and 22, the restricted passages 23 and 24 limit the rate of the equalization of the pressures, so that a substantial change in the pressure applied in chamber 20 will effect a movement of the diaphragm 21. Thus an increase in such pressure will cause an upward deflection of diaphragm 21, while a decrease in the pressure at chamber 20 will cause a downward deflection of diaphragm 21 and the control action heretofore described.

Although only one embodiment of the invention has been illustrated and described, various changes in the form and relative arrangements of the parts may be made to suit requirements.

What is claimed is:

1. For use with a jet engine having a combustion chamber and a fuel nozzle for said chamber; means for regulating the supply of fuel to said nozzle, comprising in combination, a fuel flow regulating valve, combustion chamber fluid pressure responsive means, and power means controlled by said last mentioned means for operating said regulating valve so as to alternately increase and decrease the flow of fuel to said nozzle upon a decrease in the combustion chamber pressure so as to maintain the combustion chamber pressure at an approximate optimum value in which said pressure responsive means includes a membrane responsive to changes in combustion chamber pressure, a servo valve means, a servo piston controlled by said valve means, an adjustable transfer valve means for controlling said power means, means operatively connecting said servo piston to said transfer valve means upon movement of said servo piston in one direction only, said transfer valve means adjustably positioned by said servo piston upon movement in said one direction, said transfer valve means arranged in a first adjusted position thereof to affect said power means so as to increase the flow of fuel to the nozzle through the regulating valve and in the next succeeding adjusted position thereof to alternately affect said power means so as to decrease the flow of fuel to the nozzle through the regulating valve, and said servo valve means operatively connected to said membrane and so arranged that adjustment of said transfer valve means by the servo piston from the first position to the next succeeding position may be effected through operation of the servo valve means only upon a substantial decrease in the combustion chamber pressure.

2. For use with a jet engine having a combustion chamber and a fuel nozzle for said chamber; means for regulating the supply of fuel to said nozzle, comprising in combination, a fuel flow regulating valve, combustion chamber fluid pressure responsive means, and power means controlled by said last mentioned means for operating said regulating valve so as to alternately increase and decrease the flow of fuel to said nozzle upon a decrease in the combustion chamber pressure so as to maintain the combustion chamber pressure at an approximate optimum value in which the power means includes a spring to bias said regulating valve in a direction to decrease the flow of fuel to the fuel nozzle, and a first piston for varying the tension of the spring; and the pressure responsive means includes a membrane responsive to changes in combustion chamber pressure, a second valve means, a second piston controlled by the second valve means, a third valve means to control said first piston, ratchet means operatively connecting said second piston to said third valve means upon movement of said second piston in one direction only, said third valve means being adjustably positioned by said second piston and arranged in a first adjusted position thereof to affect said first piston so as to increase the flow of fuel to the nozzle through the regulating valve and in the next succeeding adjusted position thereof to alternately affect said first piston so as to decrease the flow of fuel to the nozzle through the regulating valve, and means operatively connecting said membrane to said second valve means so that adjustment of said third valve means by the second piston from the first position to the next succeeding position may be affected through operation of the second valve means only upon a substantial decrease in the combustion chamber pressure.

3. For use with an intermittent jet engine having a combustion chamber and a fuel nozzle for said chamber; means for regulating the supply of fuel to said nozzle, comprising, in combination, a slidably mounted fuel flow throttling valve; power means to adjustably position the throttling valve, said power means including a spring to bias said throttling valve in a direction to decrease the flow of fuel to the fuel nozzle, and a first piston for varying the tension of the spring; and a combustion chamber pressure responsive mechanism, said mechanism including a membrane responsive to changes in combustion chamber pressure, a servo valve, a second piston controlled by the servo valve, a rotary valve to control said first piston, a ratchet drivingly connected to said rotary valve, and a pawl connected to said second piston to operatively engage said ratchet, said rotary valve being adjustably positioned through said pawl and ratchet to alternately affect said first piston so as to increase and decrease the flow of fuel to the nozzle through the regulating valve and said servo valve operatively connected to said membrane in such a manner that adjustment of said rotary valve by the second piston is effected only upon a substantial decrease in the combustion chamber pressure.

4. For use with a ram jet engine having a combustion chamber and a fuel nozzle for said chamber; means for regulating the flow of fuel to said nozzle, comprising in combination, a fuel flow regulating element, combustion chamber pressure responsive means, motor means controlled by said last mentioned means to position said regulating element, including an adjustable control element movable in one direction only, means controlled by said element to effect in one position thereof operation of the motor means in a direction to cause adjustment of the fuel regulating means in a sense to increase the flow of fuel to said nozzle and in the next succeeding position of said control element operation of the motor means in an opposite direction to cause adjustment of the fuel regulating means in a sense to decrease the flow of fuel to said nozzle, means operatively connecting said pressure responsive means to said control element to affect the movement thereof in said one direction upon a decrease in the combustion chamber pressure so as to tend to maintain the combustion chamber pressure at an approximate optimum value.

5. The combination comprising a valve chamber having a fluid fuel outlet, a regulating valve having a fluid fuel inlet to said chamber and slidably mounted in said chamber to control flow of fuel under pressure to said chamber, a spring operatively connected at one end to said valve to bias said regulating valve in a direction for decreasing the flow of fuel through said inlet to said chamber, said spring biasing said regulating valve in opposition to the pressure of the fuel in said chamber, a cylinder, a piston operatively positioned in said cylinder and connected to an opposite end of said spring for varying the tension of said spring, a control valve, fluid pressure conduit means controlled by said control valve and operatively connected to said cylinder to vary the position of said piston, and means alternately operable to affect said control valve so as to cause said piston to increase and decrease the tension of said spring.

6. The combination comprising a valve chamber having a fluid fuel outlet, a regulating valve having a fluid fuel inlet to said chamber and slidably mounted in said chamber to control flow of fuel under pressure to said chamber, a spring operatively connected at one end to said valve to bias said regulating valve in a direction for decreasing the flow of fuel through said inlet to said chamber, said spring biasing said regulating valve in opposition to the pressure of the fuel in said chamber, a piston, a piston chamber in which said piston is slidably mounted, a control valve, fluid pressure conduit means controlled by said control valve and operatively connected to said piston chamber to effect movement of said piston, a plate member at the opposite end of said spring, a piston rod operatively connecting said piston and plate member, a seal between said piston chamber and the regulating valve chamber and about the piston rod, and said seal retarding movement of said piston rod.

7. In a pressure operated controller; the combination comprising a fluid regulating element, a pressure sensing means, first power means controlled by said last mentioned means, second power means to position said regulating element, means operated by said pressure sensing means to control said first power means, control means for said second power means, and releasable means operatively connecting said first power means to the control means of said second power means upon movement of said first power means in one direction only so as to alternately affect said regulating element in one sense upon the pressure affecting said sensing means decreasing so as to increase such pressure and then in an opposite sense upon the pressure affecting said sensing means once again decreasing after the last mentioned increase in such pressure so as to effect another increase in the pressure affecting said pressure sensing means.

8. In a pressure operated controller; the combination comprising a fluid regulating element, a pressure sensing means, a first piston, fluid pressure conduit means controlled by said pressure sensing means to apply an operating pressure to one side of the first piston to effect movement of the first piston in one direction upon a decrease in the sensed pressure below a predetermined value, a rotary valve, a pawl and ratchet operatively connecting said first piston and rotary valve upon movement of the first piston in said one direction, spring means to bias said first piston in an opposite direction upon an increase in the sensed pressure so as to cause the pawl and ratchet to operatively disconnect said first piston and rotary valve, a second piston to position said regulating element, said rotary valve adjusted by movement of said first piston in said one direction, and fluid pressure conduit means controlled by said rotary valve so as to alternately apply an operating pressure to one side and then to the other side of the second piston upon adjustment of said rotary valve by said first piston through said ratchet and pawl from one position to the next succeeding position so as to tend to maintain the regulating valve at an optimum adjusted position.

9. For use with an intermittent jet engine having a combustion chamber and a fuel nozzle for said chamber; means for regulating the supply of fuel to said nozzle, comprising, in combination, an adjustably positioned fuel flow throttling valve; first power means to adjustably position the throttling valve, a combustion chamber pressure responsive mechanism, said mechanism including a membrane responsive to changes in combustion chamber pressure, control means operatively connected to said membrane, second power means controlled by said control means, another control means for the first power means, means operatively connecting said second power means to said other control means upon movement of the second power means in one direction only and operatively disconnecting said second power means from said other control means upon movement of the second power means in another direction, said other control means being adjustably positioned through said connecting means by said second power means only upon movement thereof in said one direction, said first mentioned control means being arranged to effect movement of said second power means in said one direction only upon a substantial decrease in the combustion chamber pressure acting upon the membrane operatively connected to said first mentioned control means, said other control means being arranged to cause said first power means to adjustably position the fuel throttling valve in a fuel increasing sense upon a first adjustment of said second power means in said one direction and said other control means being arranged to alternately cause said first power means to adjustably position the fuel throttling valve in a fuel decreasing sense upon a second adjustment of said second power means in said one direction.

10. For use with an intermittent jet engine having a combustion chamber and a fuel nozzle for said chamber, means for regulating the supply of fuel to said nozzle, comprising, in combination, an adjustably positioned valve for regulating flow of fuel, a pressure responsive mechanism for sensing changes in the combustion chamber pressure, means operatively connecting said pressure responsive mechanism to said regulating valve upon a decrease only in the pressure sensed thereby, said connecting means including means alternately operable upon a decrease in the pressure sensed by said mechanism to adjustably position said regulating valve in a fuel flow increasing sense and in a fuel flow decreasing sense.

References Cited in the file of this patent

UNITED STATES PATENTS

| Number | Name | Date |
|---|---|---|
| 404,361 | McFeely | May 28, 1889 |
| 501,959 | Rawlings | July 25, 1893 |
| 514,394 | Van Everen et al. | Feb. 6, 1894 |
| 1,025,341 | Turner | May 7, 1912 |
| 1,052,588 | Janicki | Feb. 11, 1913 |
| 1,740,877 | Sharp | Dec. 24, 1929 |
| 2,336,052 | Anderson | Dec. 7, 1943 |

(Other references on following page)

UNITED STATES PATENTS

| Number | Name | Date |
|---|---|---|
| 2,361,885 | Tate | Oct. 31, 1944 |
| 2,385,664 | Warner | Sept. 25, 1945 |
| 2,391,291 | Bollo | Dec. 18, 1945 |
| 2,401,144 | Dube | May 28, 1946 |
| 2,432,177 | Sédille | Dec. 9, 1947 |
| 2,453,812 | Phelan | Nov. 16, 1948 |

FOREIGN PATENTS

| Number | Country | Date |
|---|---|---|
| 606,613 | France | Mar. 12, 1926 |